United States Patent [19]

Lagasse

[11] 3,909,952
[45] Oct. 7, 1975

[54] PLUMB LIGHT
[76] Inventor: Guy Lagasse, 94 Bush Hill Rd., Manchester, Conn. 06040
[22] Filed: Apr. 29, 1974
[21] Appl. No.: 465,320

[52] U.S. Cl. .................... 33/227; 33/189; 33/283; 33/286; 33/299
[51] Int. Cl.² .................. G01C 15/00; G01C 15/10; G01C 15/02
[58] Field of Search ............. 33/227, 286, 299, 189, 33/283, 292

[56] References Cited
UNITED STATES PATENTS

| | | | |
|---|---|---|---|
| 3,044,173 | 7/1962 | O'Neal et al. | 33/227 |
| 3,324,557 | 6/1967 | Hodges | 33/227 |
| 3,505,739 | 4/1970 | Abrams | 33/227 |

*Primary Examiner*—Richard E. Aegerter
*Assistant Examiner*—Steven L. Stephan

[57] ABSTRACT

A plumb light is provided which is operable for establishing the position of a point, the location of which is unknown, through the use of light when the location of another point is known. The plumb light comprises a frame, light means, mounting means for the light means supportable on the frame, and index means. The frame consists of a planar member having a multiplicity of legs extending outwardly therefrom at preselected angles relative to the major axis of the planar member and means formed in the planar member operable for adjustably supporting the mounting means thereon. Each of the legs is provided with adjustment means operable for adjusting the level of the planar member relative to a supporting floor surface. The mounting means which functions as a support for the light means includes first means operable to permit 360° adjustment of the light means about a vertical axis and second means operable to permit the major axis of the light means to be selectively positioned at angles between 0° to 90° relative to the plane of the planar member of the frame. The light means includes means operable for projecting the image of a cross hair on a surface so that the center of the cross hair serves to locate the position of the unknown point sought to be established. The index means which is supportable on the mounting means is employed as an indicator to mark the location of the known point.

7 Claims, 7 Drawing Figures

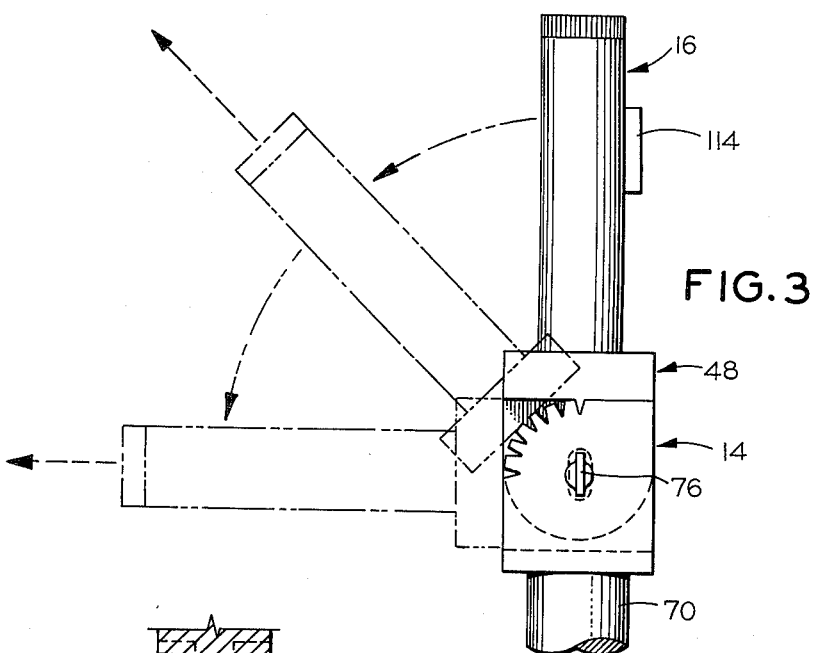
FIG.3
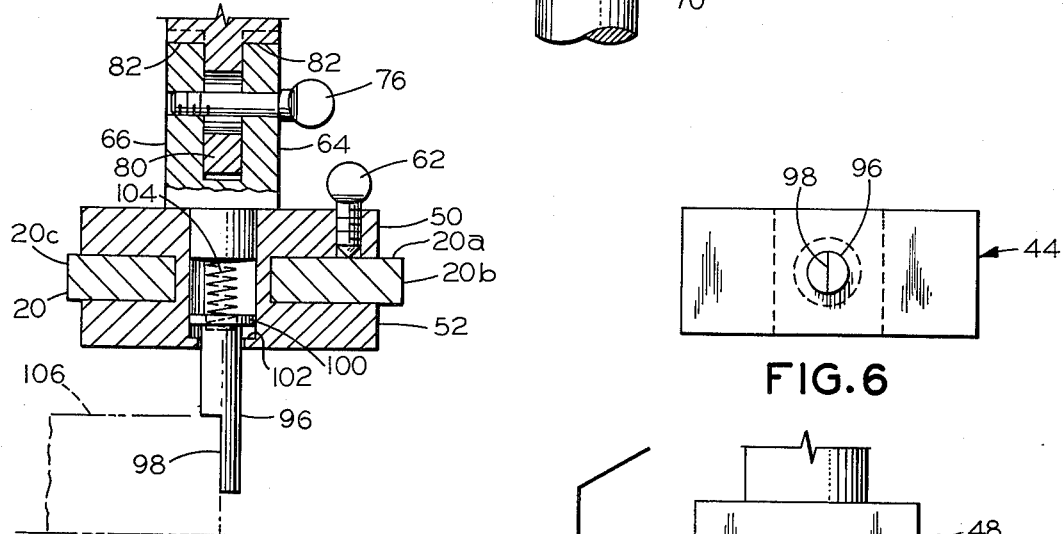
FIG.5
FIG.6
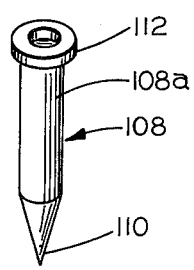
FIG.7
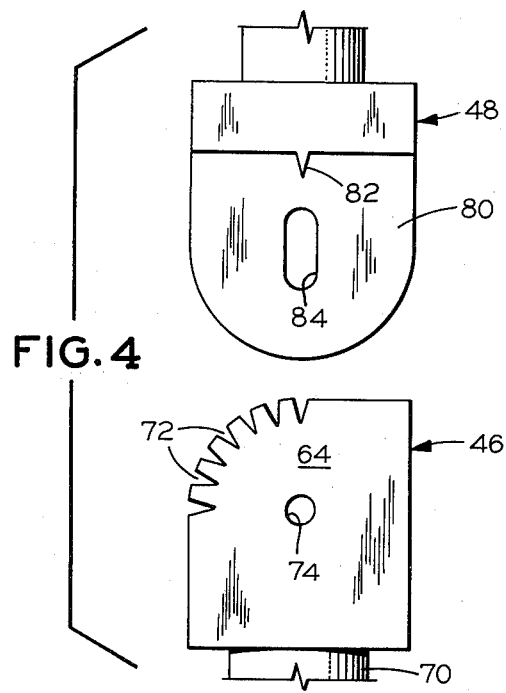
FIG.4

PLUMB LIGHT

BACKGROUND OF THE INVENTION

Craftsmen have long been accustomed to employ plumb devices for purposes of establishing the position of a point, the location of which is unknown, relative to another point, the location of which is known. Such plumb devices have been put to countless uses such as for example, establishing the location on a floor surface of a spot which is aligned with a known point that is located in spaced relation vertically above the spot, establishing the position of a point which is located vertically in spaced relation to a known spot on a floor surface so that the point and the spot are vertically aligned, etc. The form of plumb devices which is probably the most familiar to all is that known as a plumb bob. The latter commonly consists of a length of string from which a bob comprising a conically shaped weight is suspended so that the tip of the bob points downwardly. The plumb bob depends for its operation on the influences of gravity. More particularly, given the location of a spot on a floor surface, by suspending the plumb bob thereabove with the point thereof directly over the spot, the end of the string from which the bob is suspended defines the location of another point which is vertically aligned with the spot on the floor surface. On the other hand, where the location of the spot on the floor surface is unknown, but the location of a point thereabove is known, it is possible by suspending the free end of the string from the known point to establish the position of the spot on the floor surface which is directly aligned vertically with the known point inasmuch as the tip of the bob will mark the location of this previously unknown spot on the floor surface. Notwithstanding the fact that the aforedescribed plumb bob has had the most widespread usage heretofore, this form of plumb device has nevertheless been characterized by the fact that it inherently possesses a number of undesirable features.

For example, one disadvantage of the aforedescribed plumb bob is that its use requires that the plumb bob be firmly suspended with the pointed end thereof positioned in close proximity to the floor surface. This is necessary in order to be able to accurately identify the spot on the floor surface to which the pointed end of the plumb bob is pointing. Moreover, when the plumb bob ceases its pendulum-like swinging, it is almost necessary for one to lie prone on the ground to determine the spot thereon which is being indicated by the pointed end of the plumb bob. It should thus be readily apparent that to make efficient usage of such a plumb bob requires the efforts of two people, namely one to suspend the plumb bob and the other to determine and mark the spot on the floor surface which is being designated by the indicator portion, i.e., the pointed end of the plumb bob.

Likewise, the aforereferenced plumb bob has been found to be difficult to employ in those situations wherein the spot on the floor surface is known and it is desired for one reason or another to locate a point spaced from but vertically aligned with the known spot on the floor surface. In such a case, with the pointed end of the plumb bob positioned over the known spot on the floor surface, it is necessary to sight along the plumb bob to locate the desired point. This is most often found to involve a time-consuming process requiring a multiplicity of hit and miss attempts before the desired result is achieved. A need also exists in this type of application for the services of two people, i.e., one to guide the pointed end of the plumb bob over the known spot on the floor surface and the other to identify the desired point vertically spaced from the aforesaid known spot.

In an attempt to obviate the disadvantages noted in the preceding paragraph which characterize the prior art forms of plumb bob, there have been proposed, as is readily apparent from a reference to the prior art, plumb devices embodying many different forms of construction. The object has also been however, to provide an improved plumb device which while obviating the aforereferenced disadvantages would at the same time retain the desirable features possessed by prior art plumb devices, namely simplicity of construction and economies of manufacture.

Apart from the aforementioned features which it is desirable be possessed by a plumb device, there are other capabilities not commonly found in a plumb device which it would be desirable to have provided therein. In this regard, reference is had to a capability of establishing the location of an unknown point relative to a known spot over relatively large distances, i.e., distances equivalent to that of the height of a normal room such as seven to ten feet. Commonly, to establish the location of a point on a ceiling relative to a known spot on a floor surface, it has been heretofore necessary when employing a plumb device to establish one or more intermediate points relative to the floor surface and then in turn use the intermediate points to establish the location of the desired point on the ceiling. Another capability which it would be desirable for a plumb device to possess is the ability to be used to establish the location of points which are spaced horizontally from the known point or at some angle other than the vertcial, i.e., some angle from 0° to 90° relative to the plane of the floor surface. Also, it would be desirable if the construction of the plumb device was such as to in addition permit the plumb device to be employed by a single individual.

Therefore, although the prior art evidences the fact that it has long been known to employ plumb devices to establish the location of an unknown point relative to a known point, and that there have been some attempts at making improvements in the construction of prior art plumb devices, it is also to be noted from reference to the prior art that very little in the way of significant changes has been actually made therein. There has thus existed a need to provide a plumb device which would overcome the disadvantages possessed by prior art forms of plumb devices referred to hereinabove and which would embody the desirable features noted above as well as other advantages relating to construction and method of employment.

Accordingly, it is an object of the present invention to provide a novel and improved plumb device operable for establishing the location of an unknown point relative to another point, given the location of the latter.

It is another object of the present invention to provide such a plumb device wherein the location of the unknown point is determined through the use of light.

A further object of the present invention is to provide such a plumb device which is capable of establishing the location of an unknown point relative to a known point wherein the two points are spaced apart by a relatively large distance, i.e., a distance which significantly exceeds the normal operating range of prior art plumb devices.

A still further object of the present invention is to provide such a plumb device which is operable to establish the location of points which are spaced horizontally from the known point or at some angle other than the vertical, i.e., some angle from 0° to 90° relative to the plane of the surface in which the known point lies.

Yet another object of the present invention is to provide such a plumb device which requires the services of only a single individual for its use.

Yet still another object of the present invention is to provide such a plumb device which is relatively simple in construction, is easy to employ, and is economical to manufacture.

SUMMARY OF THE INVENTION

It has now been found that the foregoing and related objects can be readily attained in a plumb device in the form of a plumb light which is operable for establishing the position of a point, the location of which is unknown, through the use of light when the location of another point is known. The plumb light comprises a frame, light means, mounting means for the light means supportable on the frame, and index means. The frame consists of a member having a multiplicity of legs extending outwardly therefrom at preselected angles relative to the major axis of the member and means formed in the member operable for adjustably supporting the mounting means thereon. Each of the legs is provided with adjustment means operable for adjusting the level of the member relative to a supporting floor surface. The mounting means which functions as a support for the light means includes first means operable to permit 360° adjustment of the light means about a vertical axis and second means operable to permit the major axis of the light means to be selectively positioned at angles from 0° to 90° relative to the plane of the member of the frame. The light means includes means operable for projecting the image of a cross hair on a surface so that the center of the cross hair serves to locate the position of the unknown point sought to be established. The index means which is supportable on the mounting means is employed as an indicator to mark the location of the known point.

In accord with the preferred embodiment of the invention, the frame consists of a member having a planar portion from which three legs formed integrally therewith project outwardly at a predetermined angle. Each of the three legs adjacent the free end thereof is provided with an adjustable foot. More specifically, the latter foot consists of a threaded member having a flat surface provided at one end thereof which is engageable with the ground or like supporting surface. The threaded member is threadedly engaged in a threaded opening formed for this purpose in the corresponding leg. Consequently, by adjusting the extent to which the threaded member is threaded into the opening in the leg, the distance by which the under surface of the leg is spaced from the gound or like supporting surface may be varied. The planar portion is provided with an elongated slot extending substantially parallel to the major axis of the planar portion. The slot is suitably dimensioned so as to enable the mounting means to be received therein and to be slid therealong. More specifically, in order to position the index means directly in alignment with a known spot, the mounting means is capable of being moved in the slot to locate the index means exactly over the desired point. Thus, it can be seen that the latter adjustment in position is in the nature of a fine adjustment. A pair of levels are preferably mounted on the frame so that their major axes intersect at right angles. These levels are utilized to ensure that the upper surface of the frame is level thereby providing a level base for the mounting means and more particularly the light means supported thereon. The mounting means includes an opening provided therein which is suitably dimensioned so as to be capable of receiving one end of the light means. Moreover, the dimension of the latter opening is such as to enable the light means to be rotated therein through 360° around a vertical axis. In addition, the mounting means includes a first portion which is pivotable relative to a second portion. The aforedescribed opening in the mounting means is found in the first portion thereof. Accordingly, with the light means supported on the first portion of the mounting means, the first portion is pivotable relative to the second portion to enable the major axis of the light means to be selectively positioned at angles from 0° to 90° relative to the planar portion of the frame. The light means includes light providing means, and a cross hair supported in the path of the light. The index means may take a plurality of different forms depending upon the particular application in which the plumb light is being employed.

BRIEF DESCRIPTION OF THE DRAWINGS

FIG. 3 is a side elevational view of a portion of a plumb light constructed in accordance with the present invention, illustrating in solid lines the light means in its vertical position and in broken lines other positions which the light means is capable of occupying;

FIG. 4 is an exploded side elevational view of the components of the mounting means of a plumb light constructed in accordance with the present invention by means of which the light means is selectively positionable at angles from 0° to 90°;

FIG. 5 is a cross sectional view of a portion of a plumb light constructed in accordance with the present invention, illustrating the index means in association with a marker;

FIG. 6 is a bottom view of the index means of a plumb light constructed in accordance with the present invention; and FIG. 7 is a perspective view of another embodiment of an index means usable in a plumb light constructed in accordance with the present invention.

DETAILED DESCRIPTION OF THE ILLUSTRATED EMBODIMENT

Figure 1:
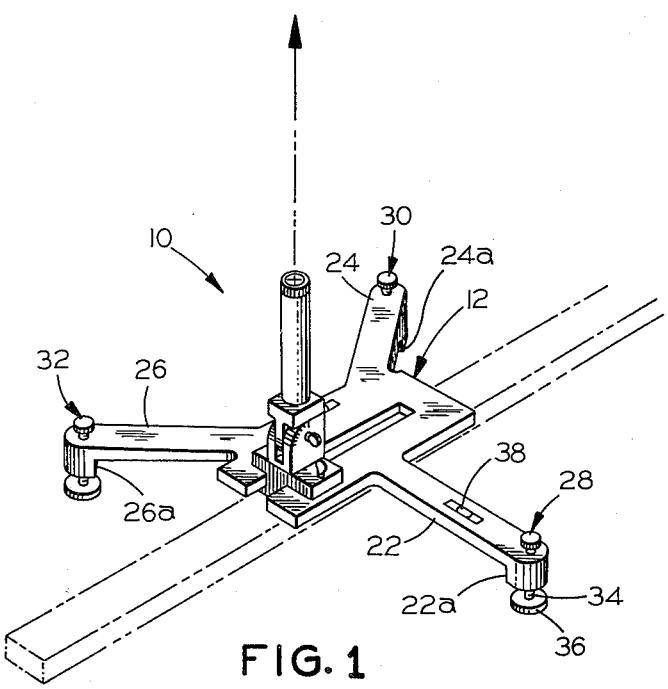
FIG. 1 is a perspective view of a plumb light constructed in accordance with the present invention.

Referring now to the drawings and more particularly FIG. 1 thereof, there is illustrated therein a plumb light, generally designated by reference numeral 10, constructed in accordance with the present invention. The plumb light 10 is operable for establishing the position of a point, the location of which is unknown, through the use of light when the location of another point is known. The major components of the plumb light 10 in accord with the embodiment thereof shown in the drawings consists of a frame 12, mounting means 14, light means 16, and index means 18.

Figure 2:
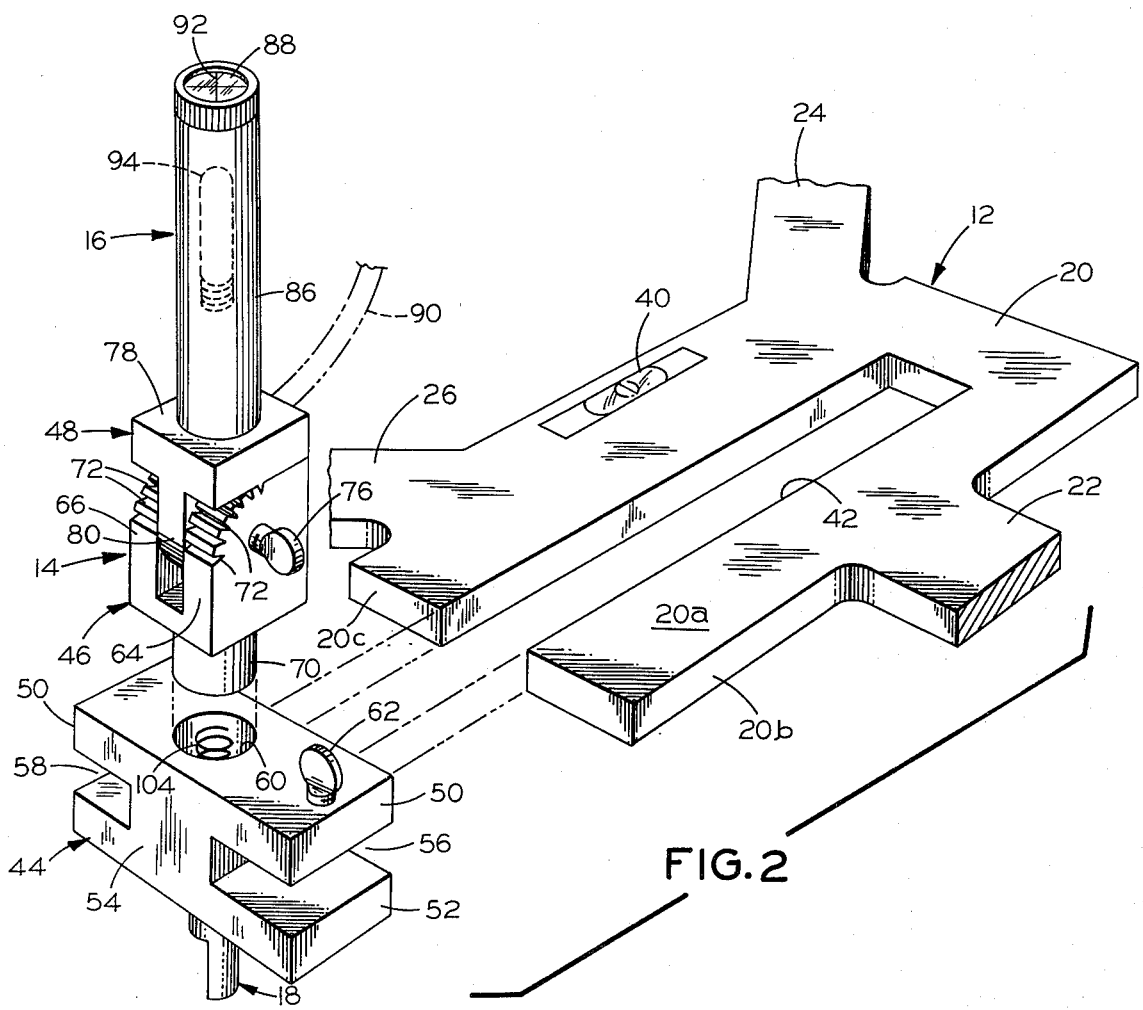
FIG. 2 is an exploded perspective view on an enlarged scale of a portion of a plumb light constructed in accordance with the present invention.

As best understood with reference to FIGS. 1 and 2 of the drawings, the frame 12 includes a planar portion 20 and three outwardly extending legs 22, 24 and 26. In accord with the preferred embodiment of the invention, the legs 22, 24 and 26 are formed integrally with the planar portion 20. Moreover, it will be noted from the drawings that two of the legs, i.e., legs 24 and 26 extend outwardly from the side of the planar portion 20 at angles other than right angles. The particular angles at which the legs 22, 24 and 26 project outwardly from the planar portion 20 are preselected in order that the legs 22, 24 and 26 are located relative to the major axis of the planar portion 20 so as not to interfere with the manner of use of the index means 18, the use of which will be described more fully hereinafter. To this same end, each of the legs 22, 24 and 26 is provided with a cutout portion 22a, 24a and 26a operable to provide clearance between the under surface of the frame 12 and a marking member.

Each of the legs 22, 24 and 26 is provided at its free end with an adjustment means 28, 30 and 32, respectively. Inasmuch as each of the adjustment means 28, 30 and 32 embodies the identical construction, it is only deemed necessary to describe herein the construction of one of the three adjustment means 28, 30 and 32. Thus, considering the adjustment means 28 by way of example, the adjustment means 28 includes a threaded member 34 which is received in a threaded opening (not shown) provided therefor adjacent the free end of the leg 22. The free end of the threaded member 34 is provided with a substantially flat member 36 operable in the manner of a foot. The latter referenced member 36 is designed to engage the ground or other like supporting surface upon which the plumb light 10 is positioned in supported relation. By varying the amount by which the flat member 36 is spaced from the under surface of the leg 22, the height of the planar portion 20 measured at the upper surface 20a thereof may be adjusted. The adjustment means 28, 30 and 32 are thus designed to be employed to adjust the frame 12 relative to the ground or like supporting surface so as to establish a level base for the mounting means 14 and more particularly the light means 16 supported thereon. For purposes of providing an indication as to when the frame 12 is level, a pair of level vials 38 and 40 of conventional construction are suitably mounted on the frame 12. More specifically, the vial 38 is supported on the leg 22 so as to be aligned with the major axis of the latter. The vial 40 on the other hand is supported on the planar portion 20 so as to be aligned with the major axis thereof whereby the planes through the major axes of the vials 38 and 40 intersect at right angles. It will be readily apparent from FIG. 1 of the drawings, that by utilizing the adjustment means 28, 30 and 32, the height of the frame 12 may be adjusted so as to render the latter level, the establishment of which condition can be noted when the bubble in each of the vials 38 and 40 is centered. Although not shown in the drawings in the interest of maintaining clarity of illustration therein, in accord with the preferred embodiment of the invention, the level 38 is supported in a suitable opening (not shown) provided therefor in the leg 22 through the use of means operable to enable the level vial 38 to be adjusted relative to the leg 22 whereby the correct orientation of the level vial 38 relative to the upper surface of the leg 22 is capable of being maintained. Similarly, the level vial 40 is supported in a suitable opening (not shown) provided in the planar portion 20 through the use of means operable to enable the level vial 40 to be adjusted relative to the upper surface 20a of the planar portion 20 so as to afford a means of ensuring that the level vial 40 is always correctly disposed relative to the upper surface 20a of the planar portion 20.

Referring now to FIG. 2 of the drawings the planar portion 20 of the frame 12 has formed therein an elongated slot 42, which is elongated substantially in the same direction as the major axis of the planar portion 20. Moreover, it will be noted with reference to FIG. 2 that the slot 42 is located so as to be spaced substantially equally distant from the side walls from which the legs 22, 24 and 26 extend outwardly, i.e., the side walls 20b and 20c. The slot 42 is substantially dimensioned so as to be capable of receiving the mounting means 14 therein for sliding movement therealong in a manner which will be described subsequently.

Turning now to a description of the construction of the mounting means 14, reference will be had for this purpose to FIGS. 1–5 of the drawings. As best understood with reference to FIG. 2, the mounting means 14 consists basically of three components, namely, a base 44, a rotatable member 46 and a pivotable member 48. The base 44 in a manner yet to be described is configured so as to be cooperable with the frame 12 whereby to permit the mounting means 14 to be mounted on the frame 12. The rotatable member 46 in turn is mountable on the base 44 so that the member 46 is capable of being rotated throughout 360° relative to its own major axis while still remaining mountable on the base 44. The pivotable member 48 is supported on the rotatable member 46 and coacts therewith in such a manner that the major axis of the pivotable member 48 is capable of being selectively oriented relative to the major axis of the rotatable member 46 so as to form any angle between 0° and 90° relative thereto.

The base 44 has a generally H-shaped configuration which is defined by a pair of legs 50 and 52 which are interconnected substantially at their midpoint by a medial portion 54 whereby there is defined a pair of slots 56 and 58 in the base 44. As formed in the base 44, the slots 56 and 58 are spaced apart a distance corresponding to the width of the slot 42 provided in the frame 12. Moreover, the width of each of the slots 56 and 58 corresponds to the thickness of the planar portion 20 of the frame 12 so that the base 44 is capable of being received in the slot 42 in the manner best seen with reference to FIGS. 1, 2 and 5 of the drawings. The base 44 in addition is provided with a through hole 60 formed substantially at the center thereof for a purpose which will be set forth hereinafter. Finally, in accord with the preferred embodiment of the invention, a suitably located threaded opening (not shown) is provided in the leg 50 of the base 44 communicating with the slot 56 of the latter. A wing nut 62 is threadedly engaged in the latter referenced opening and is operable to retain the base 44 and thereby the mounting means 14 located in any preselected position along the length of the slot 42 when the base 44 is mounted on the frame 12. More particularly, as illustrated in FIG. 5 of the drawings, the wing nut 62 is designed to be threaded into engagement with the upper surface 20a of the planar portion 20 whereby it is effective to lock the base 44 and thereby the mounting means 14 against movement within the slot 42 and relative to the frame 12.

Considering next the construction of the rotatable member 46, the latter in general has the shape of a yoke, i.e., is substantially Y-shaped in configuration. This configuration is provided by a pair of spaced upstanding legs 64 and 66 which cooperate to define a slot 68 thereby, and a depending circular portion 70. The diameter of the circular portion 70 is made to conform to the diameter of the opening 60 in the base 44 so as to enable the rotatable member 46 to be assembled with the base 44 through the insertion of the circular portion 70 of the former in the opening 60 provided for this purpose in the latter. As best understood with reference to FIGS. 3 and 4 of the drawings, the free end of each of the legs 64 and 66 is preferably rounded and has a plurality of notches 72 formed along an arc of at least 90° thereof. The function of the notches 72 as well as their method of use will be described subsequently. It is merely necessary at this point to note their existence. Completing the description of the construction of the rotatable member 46, the latter is provided with a threaded opening 74 which extends in aligned relation through both the legs 64 and 66 and substantially at the center thereof. The opening 74 is suitably dimensioned so as to be capable of receiving therewithin in threaded engagement therewith the wing nut 76. The latter wing nut 76 is utilized to maintain the pivotable member 48 assembled to the rotatable member 46 as will be described more fully later.

Regarding the nature of the construction of the pivotable member 48 which comprises the last of the three components included in the mounting means 14, the pivotable member 48 is substantially T-shaped in configuration. More particularly, the pivotable member 48 includes a transversely extending planar portion 78 from which a laterally extending portion 80 projects outwardly thereof in depending relation relative thereto. The upper surface of the planar portion 78 is operable as a support for the light means 16. In this regard, any known conventional method of mounting one member on another to form a rigid interconnection therebetween may be utilized for securing one end of the light means 16 on the pivotable member 48. Namely, an opening may be provided in the upper surface of the planar portion 78 into which the aforereferenced one end of the light means 16 may be received with a tight fit, or the end of the light means 16 may be affixed to the upper surface of the planar portion 78 by means of threaded fasteners, a suitable adhesive, etc. On its under surface, the planar portion 78 of the pivotable member 48 is provided with a V-shaped projection 82. The latter projection 82 is located so as to be substantially centrally positioned on the planar portion 78. In addition, although not illustrated in the drawings it is to be understood that in accord with the preferred embodiment of the invention, a V-shaped projection 82 is provided on either side of the portion 80, extending outwardly beginning adjacent the side walls of the portion 80 and terminating at the edge of the planar portion 78. The projection 82 is suitably dimensioned so as to be capable of being received within any one of the plurality of notches 72 in the manner depicted in FIGS. 2 and 3 of the drawings. Insofar as concerns the portion 80 of the pivotable member 48, the latter is preferably provided with a rounded end. Moreover, the length of the portion 80 is selected so as to correspond to the depth of the slot 68 in the rotatable member 46 whereby when the portion 80 is located in the slot 68, the projection 82 is selectively positionable in any one of the plurality of notches 72. To this end, it is also readily apparent from FIG. 2 of the drawings that the width of the portion 80 is dimensioned so as to permit the portion 80 to be received between the legs 64 and 66. Completing the description of the pivotable member 48, the latter has formed in the portion 80 an elongated opening 84 which is best seen in FIG. 4 of the drawings. The opening 84 extends completely through the portion 80 and is suitably located relative to the side walls thereof so as to be alignable with the opening 74 formed in the legs 64 and 66 of the rotatable member 46 when the portion 80 of the pivotable member 48 is received in the slot 68 of the rotatable member 46 thereby enabling the wing nut 46 to be passed through the opening 84 as best understood with reference to FIG. 5 of the drawings.

Turning now to a consideration of the nature of the construction of the light means 16, reference will be had for this purpose to FIG. 2 of the drawings. As illustrated therein, the light means 16 consists of a tubular member 86 in which there is housed a light producing source (not shown) and a lens 88 at the free end thereof. In accord with the preferred embodiment of the invention, the light producing source can take any conventional form, namely, the light producing source may consist of a battery (not shown), or an electrical wire 90 by means of which the plumb light 10 is connected in electrical circuit relation with a suitable electrical outlet (not shown). The lens 88 may be in the nature of any conventional form thereof, i.e., that commonly found employed in a penlight. There is suitably mounted on the lens 88 a cross hair 92 which is operable to define a point at the center thereof. The cross hair 92 is located so as to be positioned in the path of the light produced by the light producing source.

The light means 16 is operable to mark the location of a point on a surface by means of light. More particularly, a beam of light is projected from a light bulb 94 which is illustrated in dotted lines in FIG. 2 of the drawings through the lens 88 and cross hair 92 on to a suitable surface. The power supply for the light bulb 94 is provided as was noted above from either a battery (not shown) or from a conventional electrical outlet to which the plumb light 10 is connected by means of a wire 90. The location of the point is identified on the surface against which the beam of light from bulb 94 is focused at the center of the cross hair 92, i.e., the intersection of the two lines which together comprise the cross hair 92.

The final component of the plumb light 10 is the index means 18. The latter may take a variety of different forms depending on the particular manner in which it is desired to employ the plumb light 10. By way of illustration, there have been shown in the drawings two different forms of index means. In accord with the form thereof depicted in FIGS. 2, 5 and 6 of the drawings, the index means consists of a cylindrical member 96 which has a cutout 98 formed at one end thereof and an enlarged head 100 provided at the other end thereof. The cylindrical member 96 is suitably dimensioned so as to be mountable in the opening 60 formed in the base 44. More particularly, the head 100 of the cylindrical member 96 has an external diameter which is slightly less than the internal diameter of the opening 60. Moreover, the opening 60 in the base 44 terminates at its lower end as viewed with reference to FIG. 5 of the drawings in a shoulder portion 102 which is operable to provide the opening 60 with a portion that is of reduced diameter. The cylindrical member 96 is assembled on the base 44 of the mounting means 14 by inserting the end of the former which is provided with the cutout 98 into the opening 60, until the under surface of the enlarged head 100 of the member 96 engages the shoulder portion 102. It will thus be seen that the enlarged head 100 functions as a stop means preventing the cylindrical member 96 from being passed completely through the opening 60. In accord with the preferred embodiment of the invention, a spring 104 is also positioned in the opening 60 wherein it is operable to exert a biasing force against the head 100 of the cylindrical member 96 causing the head 100 to normally engage the shoulder portion 102 as will be referred to more fully hereinafter. The index means 18 when it takes the form of the aforedescribed cylindrical member 96 that terminates in a cutout 98 is designed to be used in the type of application wherein the reference point relative to which an unknown point is sought to be established consists of the side edge of a beam 106, the latter being schematically depicted in broken lines in FIGS. 1 and 5 of the drawings. The manner in which the location of the unknown point is established will be described hereinafter in connection with a description of the method of use of the plumb light 10.

Referring now to FIG. 7 of the drawings, there is depicted therein another embodiment of an index means which is capable of being employed in the plumb light 10. As shown therein, the index means takes the form of a cylindrical member 108 having an elongated body portion 108a which terminates at one end in a point 110 and at the other end in an enlarged head 112. The diameter of the body portion 108a of the member 108 is selected so as to permit the body portion 108a to pass through the portion of the opening 60 which is of reduced diameter whereby the pointed end 110 of the member 108 projects outwardly of the base 44 in a fashion similar to the manner in which the end of the cylindrical member 96 which is provided with the cutout 98 protrudes outwardly of the base 44 as illustrated in FIG. 5 of the drawings. The enlarged head 112 of the member 108 is dimensioned so as to be receivable within the opening 60 in the base 44 and functions in the same manner as the head 100 of the cylindrical member 96 which was described in the preceding paragraph.

Finally, for purposes of completing the description of the structure which is included in the plumb light 10, reference will be had particularly to FIG. 3 of the drawings wherein the light means 16 in accord with the preferred embodiment of the invention is illustrated as being provided with a level vial 114. The latter level vial 114 may be similar in construction to that of the level vials 38 and 40 which were described previously hereinabove. More particularly, the level vial 114 is preferably of conventional construction including a bubble and a pair of spaced, transversely extending lines wherein when the bubble is located between the pair of transverse lines the existence of this relationship denotes the fact that a level condition is present. The level vial 114 may be affixed to the light means 16 and more specifically to the side of the tubular body 86 through the use of any suitable conventional form of fastening means. For example, the level vial 114 could be mounted in a holder which in turn is fastened by means of threaded fasteners through the tubular body 86, by means of an adhesive, etc. Likewise, the level vial 114 could be attached directly to the side of the tubular body 86 by means of fasteners, adhesive, etc.

The manner in which the plumb light 10 is intended to be assembled and employed will now be described. Preparatory to being used, the plumb light 10 is first assembled in the following manner. It will be assumed for purposes of the following description that the light means 16 has previously been affixed to the upper surface of the pivotable member 48. Moreover, it will be assumed that the plumb light 10 is being employed to determine the verticality to ground of a point. Accordingly, the pivotable member 48 is cooperatively associated with the rotatable member 46 so that the V-shaped projection 82 provided on the former member is positioned within the topmost one of the plurality of notches 72 formed in the latter member. With the pivotable member 48 and the rotatable member 46 bearing the aforedescribed relationship relative to each other, they are locked in this position by tightening the wing nut 76 which passes therethrough. Next, either of the two forms of index means 18, i.e., either the cylindrical member 96 or the cylindrical member 108 is positioned within the opening 60 in the base 44 so that the corresponding enlarged head thereof is placed in engagement with the shoulder portion 102. Thereafter, the spring 104 is also placed in the opening 60 so that a biasing force is applied thereby against the enlarged head, i.e., either head 100 or head 112, tending to keep the latter in engagement with the shoulder portion 102. With the index means 18 thus supported on the base 44 of the mounting means 14, the circular portion 70 of the rotatable member 46 is positioned within the opening 60 in base 44. The latter action is effective to complete the assembly of the light means 16, the mounting means 14 and the index means 18 to form a unit thereof. The latter unit consisting of the mounting means 14, the light means 16 and the index means 18 is mounted on the frame 12 by sliding the base 44 on the planar portion 20 of the frame 12 so that the medial portion 54 of the base 44 is received within the slot 42. Once the base 44 is received in the slot 42 and is located therein at the desired position, the base 44 is locked against further movement relative to the frame 12 by operation of the wing nut 62. Assuming for purposes of this description that it is desired to establish the location of a point on a ceiling which is vertically aligned with the side edge of a beam 106 which is mounted on a floor surface, the index means 18 would take the form of the cylindrical member 96.

Thus, with the plumb light 10 having been assembled in the manner described in the preceding paragraph and with the cylindrical member 96 projecting outwardly of the bottom surface of the base 44, the plumb light 10 is placed relative to the beam 106 so that the legs 22, 24 and 26 of the former straddle the latter. In this connection, the cutout portions 22a, 24a and 26a function to provide clearance between the top surface of the beam 106 and the bottom surface of the corresponding leg 22, 24 and 26, respectively. Moreover, the plumb light 10 is located relative to the beam 106 so that the cutout 98 of the cylindrical member 96 abuts against the side edge of the beam 106 in the manner which has been shown in FIG. 5 of the drawings. Normally, the spacing between the shoulder formed at the top of the cutout 98 and the floor surface is chosen to be less than the height of the beam 106 so that in order for the aforementioned shoulder to rest on the top surface of the beam 106, the cylindrical member 96 must be biased upwardly to some extent against the force being applied to the enlarged head 100 of the cylindrical member 96 by the spring 104. In this way, an attempt is made to ensure that the cylindrical member 96 and more particularly the shoulder formed by the cutout 98 will always bear tightly against the top surface of the beam 106. At this point, it should also be noted that the plumb light 10 is constructed so that the vertical axis passing through the center of the cross hair 92 is aligned with the plane passing through the center of the cylindrical member 96 which in turn corresponds with the visible surface of the cylindrical member 96 after the cutout 98 has been formed therein. With the plumb light 10 positioned relative to the beam 106 so that the cutout 98 of cylindrical member 96 bears the aforedescribed relation to the side edge of the beam 106, the light producing source embodied in the light means 16 is actuated so that a beam of light is produced which passes through the lens 88 and the cross hair 92 causing a reproduction of the latter to be focused on the surface which is present above the floor surface on which the beam 106 is positioned. The center of the projected cross hair establishes the location of a point, the position of which was previously unknown, that is vertically aligned with the side edge of the beam 106. Although not shown in the drawings, it is to be understood that the light producing source embodied in the light means 16 may be actuated through the use of any conventional type of switch means, generally, a switch of the type which is conventionally found employed in a penlight or flashlight. Inasmuch as the construction and mode of operation of such switch means is conventional, it has not been deemed necessary to illustrate the same in the drawings or to include a more detailed description thereof hereinabove.

The plumb light 10 constructed in accordance with the present invention also possesses the capability of being employed in a number of other ways other than that described in the preceding paragraph. For example, the plumb light 10 may be utilized to align the side edge of the beam 106 relative to a point which is spaced vertically relative to the beam 106 where the location of the latter point is known but the position whereat the side edge of the beam 106 is to be located is unknown. For this type of application, the plumb light 10 is positioned on the floor surface whereat the beam 106 is to be mounted with the latter being straddled by the legs 22, 24 and 26 of the plumb light 10. The light producing source of the latter is then actuated to produce a beam of light which causes a reproduction of the cross hair 92 to be focused on the surface above the plumb light 10. The position of the plumb light 10 is adjusted on the floor surface supporting the former until the center of the reproduced cross hair coincides with the known point. To facilitate the task of aligning the center of the reproduced cross hair with the known point, the wing nut 62 may be loosened permitting the base 44 and thereby the light means 16 to be slid along the length of the slot 42 provided in the frame 12. Once the base 44 has been moved in the slot 42 a sufficient extent to align the center of the reproduced cross hair with the known point, the wing nut 62 may be once again tightened to lock the base 44 relative to the frame 12. To ensure that the upper surface of the frame 12 is level relative to the floor surface on which the plumb light 10 is positioned, use is made of the bubbles in the level vials 38 and 40. If the aforereferenced bubbles are centered in the latter vials, then the frame 12 is level. On the other hand, if the aforementioned bubbles are not centered in the level vials 38 and 40, the frame 12 is not level and must be adjusted through the use of the adjustment means 28, 30 and 32 until the level vials 38 and 40 indicate that the upper surface of the frame 12 is level. In addition, the level vial 114 provides a means of checking whether the light means 16 bears the desired orientation relative to the frame 12 when the latter has been found through the use of the level vials 38 and 40 to be level. Assuming that the preceding steps have now been completed, the beam 106 is moved relative to the cylindrical member 96 until the side edge of the former is in abutting engagement with the cutout 98 of the latter. With this relationship between the beam 106 and the cutout 98 having been established, the location of the beam 106 may be marked so that after the plumb light 10 has been removed, the beam 106 may be secured in the desired position on the floor surface. In the event that it was not possible to position the cutout 98 flush against the side edge of the beam 106 because of the manner in which the transverse axis of the cutout 98 is aligned with the major axis of the beam 106, the cylindrical member 96 may be rotated within the opening 60 in the base 44 until the cutout 98 is capable of being positioned flush with the side edge of the beam 106.

In both of the examples described above, the light means 16 is supported relative to the plane of the frame 12 so as to form a right angle therewith. More specifically, the light means 16 has been mounted in the plumb light 10 so that the known point, the center of the cross hair 92 and the unknown point are all aligned along the same vertical axis. However, the plumb light 10 is also capable of being utilized to establish the location of a point which is spaced from the location of the known point at some angle other than 0°. This is accomplished by loosening the wing nut 76 and positioning thee V-shaped projection 82 in the appropriate one of the notches 72 whereby the major axis of the light means 16 bears the desired angle measured from the vertical. In this regard, the light means 16 is capable of being supported on the mounting means 14 so that the plane in which the major axis of the former lies forms any angle between 0° and 90° relative to the plane of the frame 12.

Finally, it is also possible to utilize the plumb light 10 to establish the location of an unknown point relative to a known point rather than relative to the side edge of the beam 106. For this type of application, the index means 18 preferably takes the form of the cylindrical member 108. With the latter member 108 substituted in the plumb light 10 for the cylindrical member 96, if the known point is located on the floor surface the plumb light 10 is positioned on the latter so that the pointed end 110 of the member 108 is positioned directly over the known point. Then the light producing source in the light means 16 is actuated through the use of suitable means. In the manner previously described, the center of the reproduced cross hair establishes the location of the previously unknown point which is aligned vertically with the known point on the floor surface. The above procedure is merely reversed when the unknown point is on the floor surface and the known point is located above the floor surface. Namely, the plumb light 10 is positioned on the floor surface so that the center of the image of the cross hair being projected coincides with the known point. When this relationship has been established, the location of the unknown point on the floor surface is marked by the pointed end 110 of the cylindrical member 108.

It should be noted that in all of the examples described above, the services of only one individual is required. More specifically, it requires only one individual to assemble the plumb light 10. Once assembled, it takes only one individual to maneuver the plumb light 10 to align the known point with the unknown point. After the known point and the unknown point have been aligned, the plumb light 10 may be left alone while the individual marks the location of the previously unknown point, the position of which has been established utilizing the plumb light 10. Although only one embodiment of a plumb light constructed in accordance with the present invention has been shown in the drawings and described hereinabove, it is to be understood that modifications in the construction thereof may be made thereto by those skilled in the art without departing from the essence of the invention. In this connection, some of the modifications which can be made in the plumb light 10 have been alluded to hereinabove while others will become readily apparent to those skilled in the art when exposed to the present description and illustration of the construction of the plumb light 10. For example, the various components embodied in the mounting means 14 as well as the frame 12 may be made from any suitable material such as wood, plastic, etc. In addition, the plumb light 10 may embody means other than the legs 22, 24 and 26 for purposes of supporting the plumb light 10 on the ground or like surface without departing from the essence of the invention. Also, the means utilized to lock the base 44 against movement relative to the frame 12, may take some form other than the wing nut 62 without departing from the essence of the invention. Similarly, the pivotable member 48 may be locked relative to the rotatable member 46 through some means other than the wing nut 76 without departing from the essence of the invention.

Thus, it can be seen that the present invention provides a novel and improved plumb device operable for establishing the location of an unknown point relative to another point, given the location of the latter. Moreover, in accord with the present invention a plumb device has been provided wherein the location of the unknown point is determined through the use of light. The plumb device of the present invention is capable of being used to establish the location of an unknown point relative to a known point wherein the two points are spaced apart by a relatively large distance, i.e., a distance which significantly exceeds the normal operating range of prior art forms of plumb devices. Furthermore, a plumb device has been provided in accord with the present invention which is operable to establish the location of points which are spaced horizontally from the known point or at some angle other than the vertical, i.e., some angle from 0° to 90° relative to the plane of the surface in which the known point lies. Also, in accord with the present invention a plumb device has been provided which necessitates the services of only a single person for its use. Finally, the plumb device of the present invention is relatively simple in construction, is easy to employ, and is economical to manufacture.

Having thus described the invention, I claim:

1. A plumb device operable, where one of a pair of points is located on one surface and the other of the pair of points is located on another surface and wherein the location of one of the pair of points is known and the location of the other of the pair of points is unknown, for establishing the location of the unknown point through the use of light comprising:
   a. a frame including a planar portion having an elongated slot formed therein extending substantially the entire length thereof and leg means connected to said planar portion operable for supporting the plumb device on a floor-like surface;
   b. mounting means including a base member, a rotatable member and a pivotable member, said base member including a pair of leg portions extending in parallel relation to each other and a medial portion interconnecting said pair of leg portions substantially at the mid point thereof to form a pair of slots extending between said pair of leg portions and located on either side of said medial portion thereby providing said base member with a generally H-shaped configuration, said base member being mounted on said planar portion of said frame for sliding movement relative thereto with said medial portion of said base member received within said elongated slot of said planar portion of said frame and with one of said pair of leg portions of said base member located in juxtaposed relation to said planar portion on one side thereof and with the other of said pair of leg portions of said base member located in juxtaposed relation to said planar portion on the other side thereof, said rotatable member being mounted on said base member for rotation through 360° about a vertical axis passing through the center of said rotatable member, said pivotable member being pivotably supported on said rotatable member for selectively positioning said pivotable member relative to said rotatable member at any angle between 0° and 90° measured relative to said vertical axis passing through the center of said rotatable member;
   c. index means supported on said base member in depending relation therefrom operable for marking on one surface the position of one of the pair of points; and
   d. light means mounted on said pivotable member for movement therewith, said light means including a light producing source operable for producing a beam of light and a cross hair positioned in the path of the beam of light produced by said light producing source so that an image of said cross hair is projected on another surface with the center of the projected image of said cross hair marking the location of the other of the pair of points.

2. The plumb device as set forth in claim 1 wherein said frame further includes level indicating means mounted thereon, said leg means comprises three legs formed integrally with said planar portion of said frame and extending outwardly therefrom at different angles relative thereto, and each of said three legs includes adjustment means operable for adjusting the level of said frame relative to the floor-like surface on which said frame is supported.

3. The plumb device as set forth in claim 1 wherein said light means is mounted on said pivotable member of said mounting means for movement therewith.

4. The plumb device as set forth in claim 1 wherein said index means is resiliently mounted on said base member and includes a cylindrical member having an enlarged head formed at one end thereof cooperable with said base member for supporting said cylindrical member thereon and a cutout formed at the other end of said cylindrical member operable for marking the location of a point on a surface.

5. The plumb device as set forth in claim 1 wherein said index means is resiliently mounted on said base member and includes a cylindrical member having an enlarged head formed at one end thereof cooperable with said base member for supporting said cylindrical member thereon and a pointed tip formed at the other end of said cylindrical member operable for marking the location of a point on a surface.

6. The plumb device as set forth in claim 1 wherein said mounting means further includes first locking means operable for locking said base member against movement relative to said planar portion of said frame selectively in any one of a multiplicity of different locations thereon.

7. The plumb device as set forth in claim 6 wherein said mounting means further includes second locking means operable for locking said pivotable member against movement relative to said rotatable member selectively at any one of a multiplicity of different angles relative thereto.

* * * * *